United States Patent [19]

Tsubota

[11] 4,208,875
[45] Jun. 24, 1980

[54] APPARATUS FOR OBTAINING USEFUL WORK FROM WAVE ENERGY

[76] Inventor: Junjiro Tsubota, 2392, Jindaiji-machi Chofu-shi, Tokyo 182, Japan

[21] Appl. No.: 955,417

[22] Filed: Oct. 27, 1978

Related U.S. Application Data

[62] Division of Ser. No. 849,620, Nov. 8, 1977.

[51] Int. Cl.² .............................................. F03B 13/12
[52] U.S. Cl. ....................................... 60/495; 60/499;
60/501; 60/502; 60/398; 417/331; 417/337
[58] Field of Search .................................. 60/495–507,
60/398; 290/53, 54; 417/331, 337

[56] References Cited
U.S. PATENT DOCUMENTS

| | | | |
|---|---|---|---|
| 1,105,846 | 8/1914 | Schneider | 415/7 X |
| 3,746,875 | 7/1973 | Donatelli | 290/54 X |
| 3,965,679 | 6/1976 | Paradiso | 415/2 X |
| 4,001,596 | 1/1977 | Kurtzbein | 290/53 |

FOREIGN PATENT DOCUMENTS 7129 of 1898 United Kingdom .................. 290/54

Primary Examiner—Allen M. Ostrager
Attorney, Agent, or Firm—Shoemaker and Mattare, Ltd.

[57] ABSTRACT

An apparatus and method for obtaining useful work from or with waves includes a buoyant body having a leading edge and a trailing edge, and a convex upper surface extending between the leading and trailing edges. The upper surface is configured with a gradually sloping shape from the leading edge toward the trailing edge and terminates at the trailing edge in a sharply oppositely sloping surface, whereby the circular or orbital motion of water particles in waves is converted by the upper surface to linear flow of the water particles, and waves traveling across the surface from the leading to the trailing edge are not damped or extinguished by backwash of waves from the trailing edge toward the leading edge. Upstanding structures on the upper surface define open-ended venturi-shaped water flow channels across the upper surface which increase the velocity of the linear flow of water across the upper surface, and water-driven devices are disposed in the water flow channels to obtain work from the accelerated linear flow of water. The buoyant body floats at the surface of the body of water, with the upper surface of the buoyant body disposed beneath and substantially parallel to the surface of the water, and the configuration of the buoyant body is such that it undergoes both pitching and heaving motion as waves move therepast. Devices may be attached to the buoyant body and/or positioned therewithin to obtain work from the pitching and heaving motion of the buoyant body.

1 Claim, 35 Drawing Figures

α = PITCHING ANGLE
H = HEAVING HEIGHT

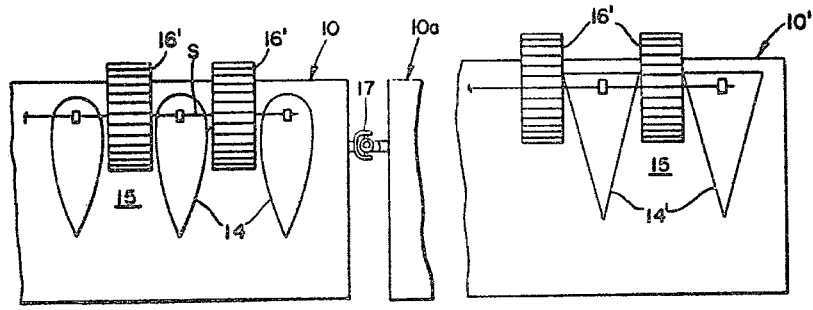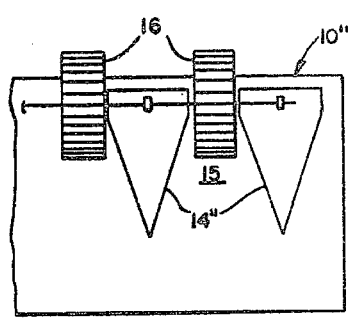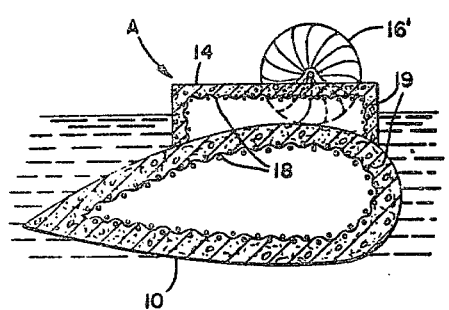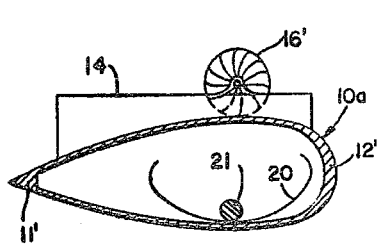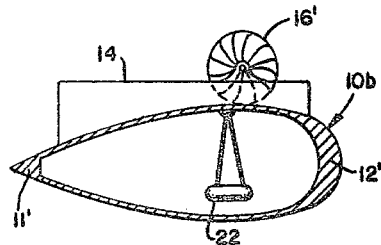

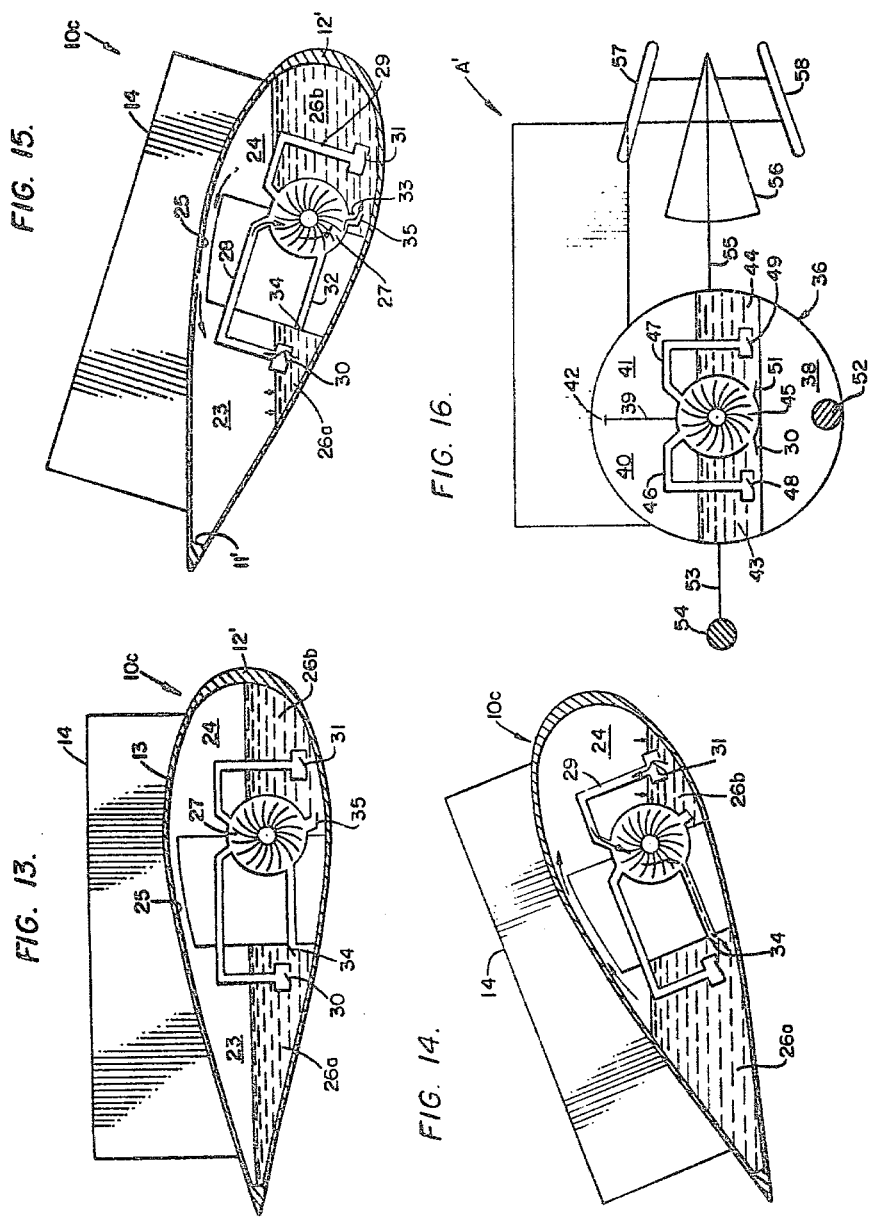

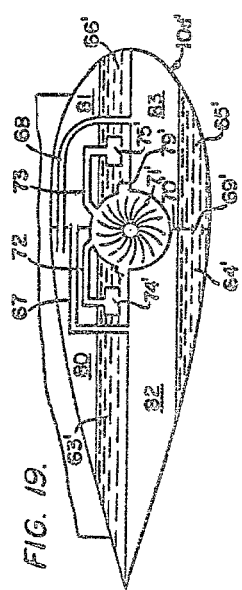
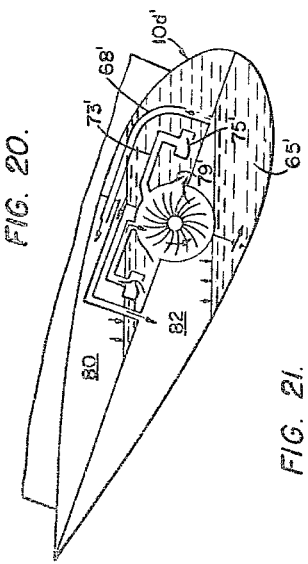
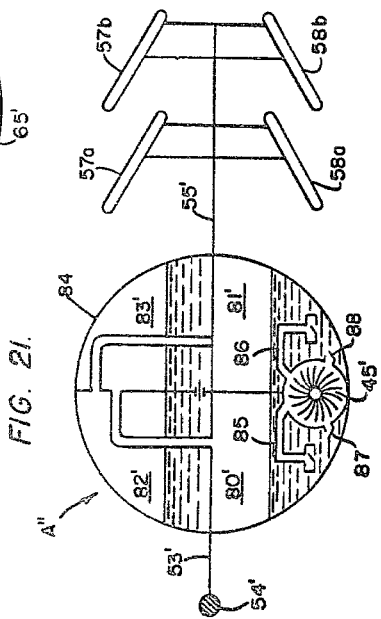
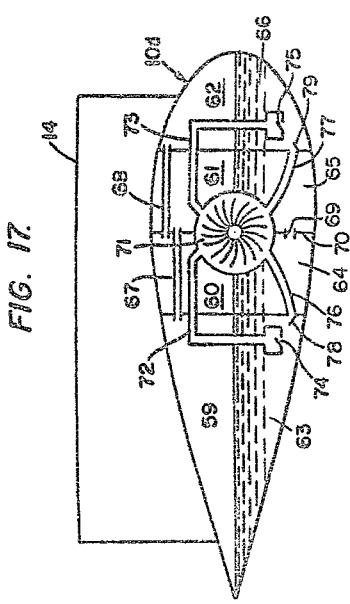
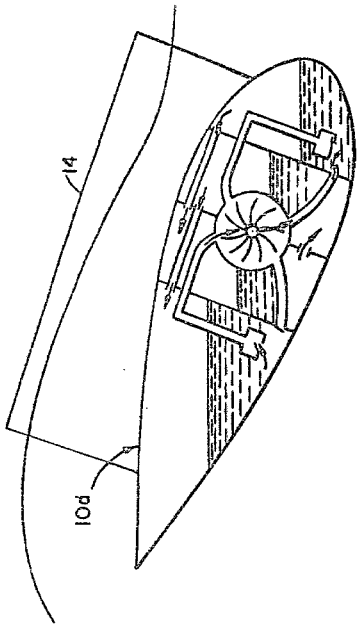

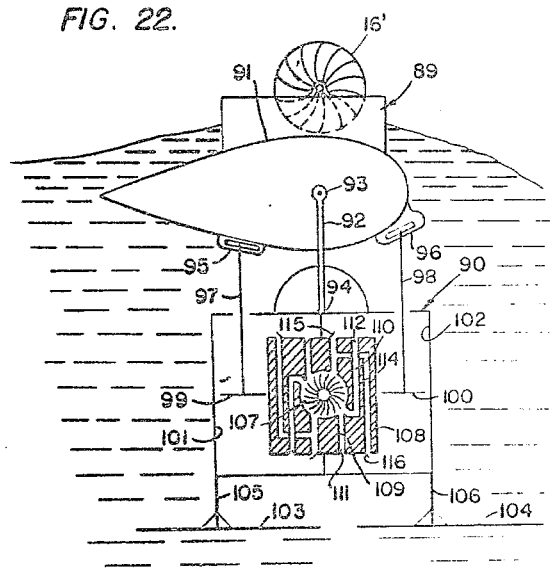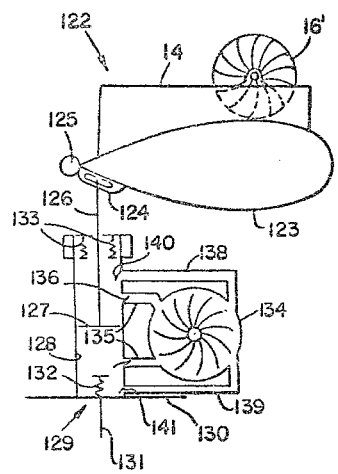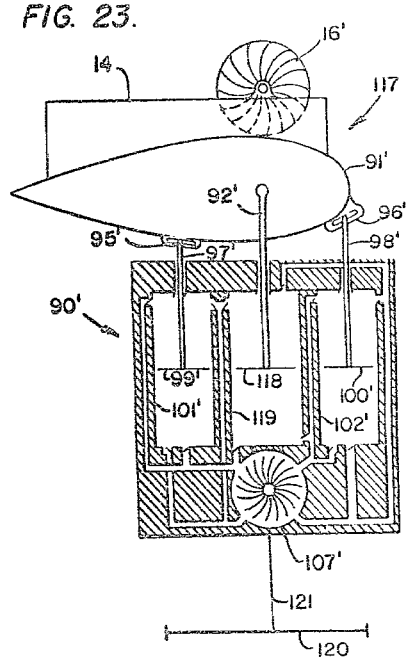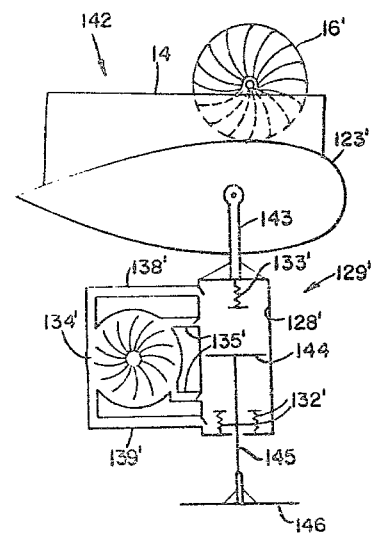

APPARATUS FOR OBTAINING USEFUL WORK FROM WAVE ENERGY

This is a division, of application Ser. No. 849,620, filed Nov. 8, 1977.

BACKGROUND OF THE INVENTION

This invention relates generally to devices or apparatus for obtaining useful work from the energy of waves.

The amount of energy or power available in waves is enormous and this power is generally recognized by the damage caused. Thus, waves are usually regarded as a hindrance rather than an asset. For example, at Wick Breakwater in Scotland a block of cemented stones weighing 1,350 tons was broken loose and moved bodily by waves. Several years later, a replacement pier weighing 2,600 tons was carried away. In other instances, a concrete block weighing 20 tons was lifted vertically to a height of 12 feet and deposited on top of a pier 5 feet above the highwater mark; stones weighing up to 7,000 pounds have been thrown over a wall 20 feet high on the southern shore of the English Channel; and on the coast of Oregon, the roof of a lighthouse 91 feet above the water was damaged by a rock weighing 135 pounds.

Heretofore this enormous amount of power available in the world's oceans has been largely ignored. One reason for this lack of utilization of the available energy in the world's oceans is their very power. In other words, most devices which have been designed for capturing or converting the energy of waves to useful work have been destroyed or damaged by that very energy. This is at least partly due to the irregularity of waves which can cause jerky or irregular motion of wave energy devices. Moreover, storms frequently occur during which time wave action can become violent, thus destroying installations erected for converting the energy of the waves to useful work. Other prior art devices are not efficient in operation and convert only a very small portion of the available wave energy. For example, the actual propagation or movement of water particles in a lateral direction is only about one percent of the velocity of travel of waves. Thus, while devices floating on the surface of a body of water may be utilized to extract some of the energy of the waves themselves, these devices are not able to extract energy from the moving water itself.

Prior art devices range from elongate cylinders or like structures bobbing at the surface of the body of water for driving a propeller carried thereby, through so-called air turbines which comprise floating bodies at the surface with open bottom chambers into which waves are permitted to rise and fall for alternately compressing air in chambers to drive a turbine, up to complex bodies specifically configured to obtain rotational movement from the action of waves and moving water particles thereon to drive turbines. These last devices are commonly referred to as Salter's Duck, for example, and are more fully described on pages 21, 22, 23 and 24 of the January, 1976 issue of THE NAVAL ARCHITECT.

All such prior art devices capture or convert only a small portion of the available power in waves and in many cases are not durable enough to withstand the forces encountered in the ocean's waters or are not cost efficient.

The present invention, on the other hand, provides a unique structure which floats at the surface of a body of water and is constructed to convert the rolling or orbital motion of water particles in the waves into a linear flow of water and to then accelerate the linear flow without using any mechanical means or process. The accelerated flow is then utilized, inter alia, to drive a water wheel, turbine or the like for extracting power from the moving body of water. The linear flow of water so created may be utilized for a variety of other industrial purposes, such as extinguishing waves or collecting substances contained in the water. The densification of the energy in the waves by converting it to linear flow and then accelerating the linear flow without using any mechanical means or process results in a substantial increase in the amount of power or energy extracted from the waves, since the energy varies in proportion to the square of the velocity of the water ($E = \frac{1}{2} MV^2$). Moreover, the device or apparatus according to the invention includes structure which is caused to pitch and heave with wave movement and has means for extracting power from the waves as a result of the pitching and heaving movement. Additionally, the apparatus of the present invention is normally disposed beneath the surface of the body of water and is free floating and is adapted to weather storms and the like without damage thereto, and in fact, the power extracted from the waves by the present invention remains smooth and substantially uninterrupted during varying conditions of the surface of the body of water.

OBJECTS OF THE INVENTION

It is an object of this invention to provide an apparatus for extracting energy from waves wherein the apparatus is simple and rugged in construction and is economical to manufacture, and which includes means for densifying wave energy before converting the energy.

Another object of the invention is to provide an apparatus for extracting useful work from wave energy, wherein the apparatus is constructed to convert the rolling orbital motion of water particles in waves to linear flow and to then accelerate the linear flow and direct the accelerated linear flow through a turbine or the like to produce useful work.

Yet another object of the invention is to provide an apparatus for converting wave energy to useful work, wherein the apparatus is constructed to pitch and heave with wave motion and wherein means is connected with the apparatus for extracting energy upon pitching motion in both directions, as well as upon heaving motion of the apparatus.

A still further object of the invention is to provide an apparatus which is constructed to extract useful energy from wave power and wherein the apparatus is free floating and is normally disposed just beneath the surface of the body of water and has an upper surface thereof normally disposed substantially parallel to the surface of the body of water and configured to convert the rolling, orbital motion of water particles in the waves to linear flow and to accelerate the linear flow without using any mechanical means or process to obtain work therefrom, the upper surface having means to prevent backwash of waves thereon.

Yet another object of the invention is to provide an apparatus for extracting useful energy from waves wherein the apparatus is buoyant and is configured and constructed to pitch and heave with wave motion and has weight means associated therewith to enhance the inertia effect to offset the reverse torque produced by the turbine or other power takeoff means.

An even further object of the invention is to provide an apparatus for converting wave energy to useful work wherein the apparatus includes means for changing the rolling, orbiting motion of water particles in the waves to linear flow and for accelerating the linear flow and including means for utilizing the accelerated linear flow to produce work, and also having means for driving a power output device upon pitching motion of the apparatus in both directions as well as upon heaving motion of the apparatus.

It is a further object of this invention to provide a method of extracting energy from waves, wherein the wave energy is densified before it is converted to useful work.

Still another object of this invention is to provide a method of extracting energy from waves, wherein the rolling, orbital movement of water particles in the waves is converted to linear flow, and the linear flow is then accelerated and directed through a turbine or water wheel and the like.

Another object of the invention is to obtain useful work from the energy of waves by extracting the energy in both directions of pitching motion of an apparatus floating on the waves, as well as from the heaving motion of the apparatus.

Yet another object of the invention is to provide a method of extracting energy from waves, wherein weights are caused to shift with movement of an apparatus provided to extract the energy, whereby the pitching movement or inertia is enhanced.

BRIEF DESCRIPTION OF THE DRAWINGS

FIG. 7 is a fragmentary plan view of the apparatus of FIG. 6 showing a plurality of devices connected together through a universal coupling.

FIG. 8 is a view similar to FIG. 7 of a modified form of the invention.

FIG. 9 is a view similar to FIG. 7 of a further modification of the invention.

FIG. 10 is a view in cross section of the apparatus of the invention showing the construction thereof from concrete.

FIG. 11 is a view in cross section of the apparatus of the invention showing a first form of weight means or inertia device therewithin.

FIG. 12 is a view similar to FIG. 11 showing a different type of weight means or pendulum in the device for imparting inertia to the pitching movement thereof.

FIG. 13 is a view in section showing a preferred form of the apparatus according to the invention with the apparatus in a neutral position.

FIG. 14 is a view in section of the apparatus of FIG. 13, showing the apparatus pitched in one direction.

FIG. 15 is a view similar to FIG. 14, with the apparatus pitched in the opposite direction.

FIG. 16 is a view with portions in section of a modified form of apparatus according to the invention wherein internal and external weights are used to impart inertia movement to the apparatus and wherein an outrigger float or vane device is used for enhancing pitching movement of the apparatus.

FIG. 17 is a view similar to FIG. 13 of a modification of the invention in FIG. 13, wherein four chambers are used inside the device rather than two as in FIG. 13.

FIG. 18 is a view similar to FIG. 15 of the apparatus of FIG. 17.

FIG. 19 is a view similar to FIG. 17 of a still further form of the invention wherein four chambers are used.

FIG. 20 is a view similar to FIG. 18 of the apparatus of FIG. 19.

FIG. 21 is a view similar to FIG. 16 of a modification of the invention shown in FIG. 16, wherein four chambers are used instead of two chambers as in FIG. 16.

FIG. 22 is a view with portions shown in section of a still further form of the invention, wherein external power takeoff means is connected with the apparatus to obtain useful work from the pitching motion of the apparatus.

FIG. 23 is a view similar to FIG. 22 of a modification of the invention of FIG. 22 wherein external power takeoff means is used and includes means for extracting energy from both the pitching motion of the apparatus in both directions and from the heaving motion of the apparatus.

FIG. 24 is a view of a still further modification of the invention, wherein a double acting piston means is connected with the apparatus to obtain useful energy from the pitching motion of the apparatus.

FIG. 25 is a view similar to FIG. 24 showing a double acting piston means for extracting useful energy from the heaving motion of the apparatus.

DETAILED DESCRIPTION OF THE INVENTION

Figure 1:
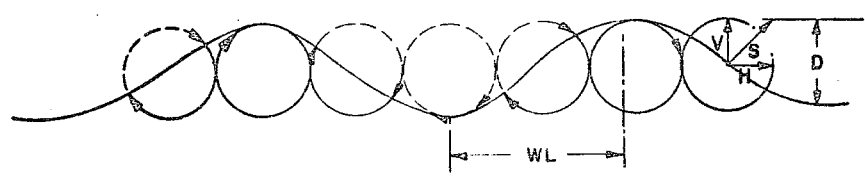
FIG. 1 is a somewhat diagrammatic view illustrating the manner in which water particles travel during wave propagation.

In the drawings, wherein like reference numerals indicate like parts throughout the several views, the movement of water particles in waves is indicated somewhat diagrammatically in FIG. 1 and, as illustrated, water particles in the waves move or propagate in a generally horizontal direction with an orbital or circular motion, the diameter of the orbital or circular motion being approximately equal to the height of the waves (the distance D from the crest to the trough). The water drift on the surface is only about one percent of the speed of travel of the waves in deep water. Thus, although the wave velocity may typically be about 4 meters per second, the actual water drift or lateral movement of water is much less. However, the circular movement of the water particles is about 1.56 times the wave velocity. Accordingly, conversion of the circular or orbital movement of the water particles to linear flow and acceleration thereof can result in water velocity of 50 meters per second or more. Therefore, since the energy equals the mass times the square of the speed of the moving water, the density of the energy or energy available is increased substantially by merely increasing the velocity of the water.

Figure 2:
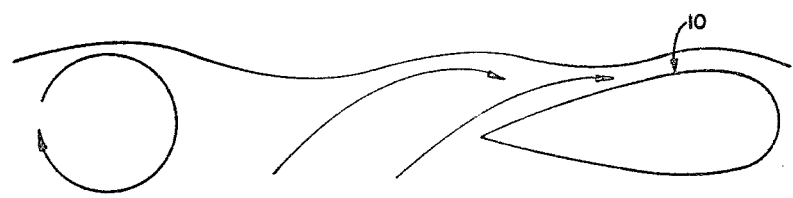
FIG. 2 is a diagrammatic view illustrating the manner in which the apparatus of the present invention operates to convert the rolling or orbital motion of the water particles in the waves to linear flow.
Figure 3:
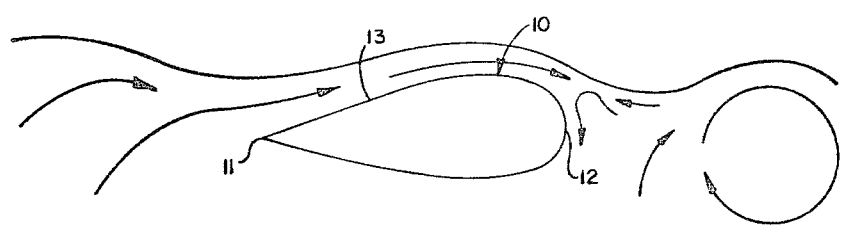
FIG. 3 is a further view similar to FIG. 2 illustrating the manner in which the apparatus of the invention operates to convert the rolling motion of water particles to linear flow and also operates to prevent backwash of waves onto the apparatus.
Figure 4:
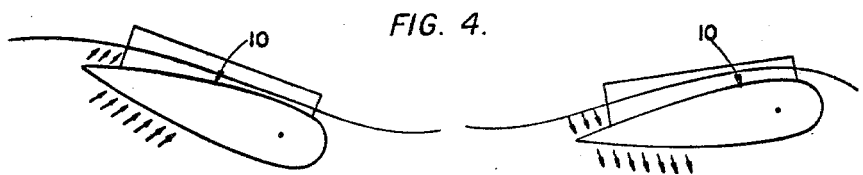
FIG. 4 is a diagrammatic view illustrating the manner in which the force vector of the movement of water particles in the waves operates upon the apparatus of the invention to cause it to pitch in opposite directions.
Figure 5:
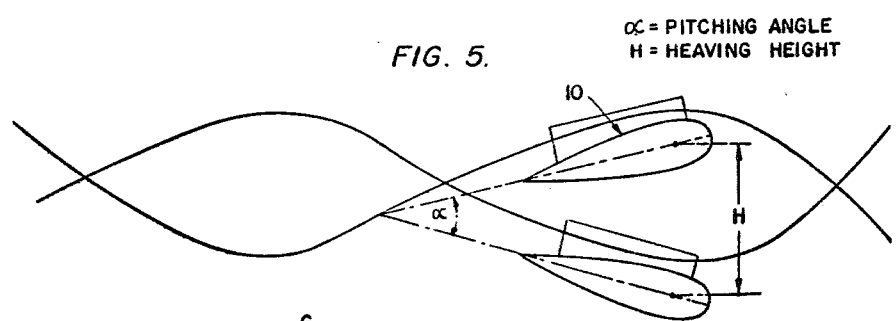
FIG. 5 is a diagrammatic view illustrating the manner in which the apparatus of the present invention pitches and heaves as waves travel therepast.

The manner in which the apparatus of the invention acts to convert the rolling or orbital motion of water particles to linear flow is somewhat diagrammatically illustrated in FIGS. 2 and 3. As can be seen, the apparatus includes a buoyant body 10 having a leading edge 11, a trailing edge 12, and a convex curved upper surface 13 extending between the leading and trailing edges 11 and 12. The upper surface 13 defines an upwardly sloping ramp from the leading edge toward the trailing edge and the ramp curves sharply downwardly at the trailing edge thereof to eliminate or substantially prevent backwash of waves onto the upper surface (see FIG. 3). Thus, as noted above, with this arrangement the flow of water may be converted to a linear stream and accelerated to 50 meters per second or more. Moreover, the rolling or orbital motion of the water particles has both horizontal and vertical force components and the buoyant body 10 of the present invention is configured to take advantage of the vector addition of these horizontal and vertical force components, as illustrated in FIG. 4, to obtain maximum force on the body to impart pitching motion thereto. As seen in FIG. 5, the propagation of waves past the body 10 results in the body pitching about an angle α and heaving a distance H. In order to obtain maximum force and movement of the body 10, the width of the body is preferably equal to or less than one-half the wave length and the length of the body is preferably equal to or less than the wave length. Additionally, the center of flotation of the apparatus preferably equals the center of gravity of the apparatus. With these parameters, the upper surface 13 of the apparatus is substantially nearly always parallel with the surface of the body of water and is beneath the surface. Accordingly, very smooth action is obtained with none of the jerkiness and erratic motion found in prior art devices.

Figure 6:
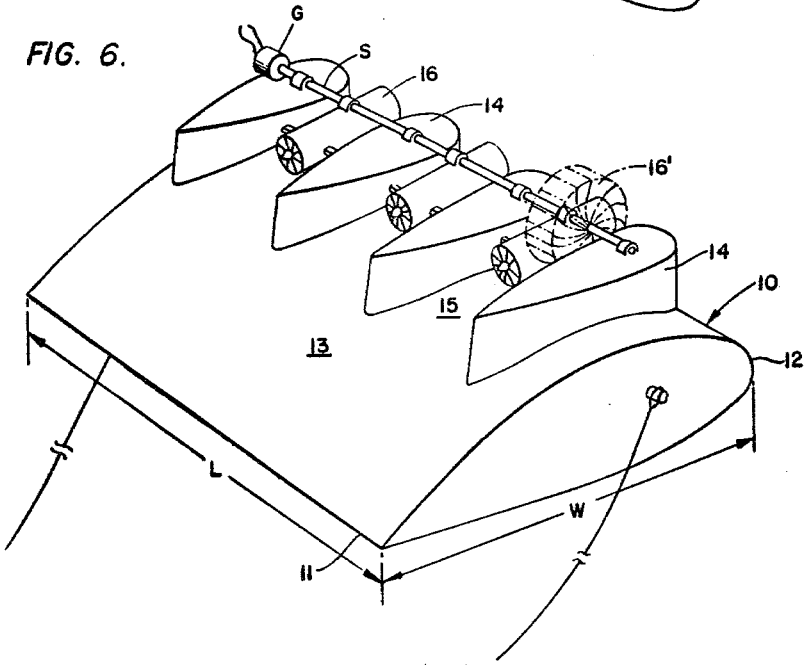
FIG. 6 is a perspective view of an apparatus according to the invention illustrating the manner in which power takeoff turbines or like water driven devices may be disposed within the flow channels defined on the upper surface of the apparatus to extract energy from the accelerated linear flow of water.

In FIG. 6 a first form of the apparatus A includes the buoyant body 10 with a plurality of substantially tear drop-shaped, parallel, spaced apart superstructures 14 on the upper surface thereof defining water flow channels 15 therebetween which grow smaller in cross section toward the apex of the upper surface 13. Disposed and supported within the water flow channels 15 are power takeoff devices such as water wheels, turbines or the like 16 supported in any suitable manner and connected with a shaft S to drive a generator G. A water wheel 16' is indicated in dot and dash lines in this figure. The water wheels or turbines may, of course, drive other devices rather than the generator G if desired. Thus, in view of the previous discussion, it will be apparent that the water wheels 16' or turbines 16 are substantially always disposed in a high velocity stream or jet of water to which fly wheels may be attached with the common axis, and accordingly, a substantial amount of power is smoothly and continuously extracted from the water movement in the waves. This arrangement differs considerably from prior art arrangements, as exemplified, for example, in U.S. Pat. No. 3,965,679, wherein a ramp 18 is supported in a fixed position relative to the bottom of a body of water and water deflectors 34 and 36 are arranged to throw or direct waves upwardly against paddle wheels 30.

In FIG. 7 a plurality of buoyant bodies 10a and 10b are coupled together by means of a universal joint or other suitable structure 17, whereby a bank of the devices may be joined together and extended over a considerable area for extracting energy from waves.

In FIGS. 8 and 9 further buoyant bodies 10' and 10" are illustrated wherein differently configured superstructures 14' and 14" are provided for accelerating the flow of water through the water flow channels 15.

In FIG. 10 a preferred construction of the buoyant body 10 and superstructure 14 is illustrated, and as can be seen, a steel or wire mesh screen 18 is formed into the general shape of the buoyant body and concrete 19 is then applied to the screen 18 to form the buoyant body and superstructure. This construction is both economical and exceptionally strong and is less subject to damage from wave action during storms and the like than are prior art devices. Of course, other materials could be used in the construction of the apparatus, but it has been found that reinforced concrete applied over the screen 18, as described, provides a superior structure.

In order to increase the inertia of the pitching movement of the body 10, it has been found that the mass or weight may be readily increased at the leading edge 11' and the trailing edge 12' to form a buoyant body 10a which has a larger inertia than a similar, unweighted body. Moreover, it has been found that a moving mass works to cancel the counterforce of the water wheel, turbine or the like during use and a very high torque efficiency can be obtained by placing a track 20 within the body 10a and placing a weight 21 thereon. Accordingly, as the body 10a pitches during use, the weight 21 shifts fore and aft enhancing the inertia of the pitching movement and cancelling the counterforce imparted by the turbine or other power takeoff device, particularly in extracting energy out of the pitching movmeent as described below.

In FIG. 12 a similar approach is illustrated wherein a pendulum weight 22 is supported inside the body 10b rather than the rolling weight as in FIG. 11.

A first, preferred form of the invention is illustrated in FIGS. 13, 14 and 15 and in this form of the invention, the body 10c has weighted leading and trailing edges 11' and 12', respectively, between which the convex curved upper surface 13 extends and on which the superstructure 14 is formed. The interior of the body 10c is divided into two chambers 23 and 24 interconnected at their top by a passageway 25 for flow of air between the chambers. A volume or body of water 26a and 26b is contained in the chambers 23 and 24, respectively, for flow therebetween to drive a turbine or other suitable water wheel or like device 27 supported in any suitable manner between the chambers 23 and 24. In order that the bodies of water 26a and 26b may be used to drive the turbine 27, first and second inlet conduits 28 and 29 extend from the chambers 23 and 24, respectively, to adjacent the upper portion of the turbine 27 and one-way valves 30 and 31 are associated with the lower ends of the conduits 28 and 29 which extend into the bodies of water 26a and 26b for flow of water from the respective chambers upwardly through the respective conduits to the upper portion of the turbine. First and second outlet conduits 32 and 33 extend from adjacent the bottom portion of the turbine 27 into the respective chambers 23 and 24 and one-way vlaves 34 and 35 control flow through the outlet conduits 32 and 33 such that when the body 10c pitches in a first direction, as illustrated in FIG. 14, the body of water 26b flows upwardly through valve 31 and conduit 29 over the turbine 27, driving the turbine and thence exiting from conduit 32 and valve 34 into chamber 23. Similarly, when the body 10c pitches in the opposite direction, as seen in FIG. 15, the body of water 26a flows from chamber 23 through valve 30 upwardly through conduit 28 onto the turbine 27, driving the turbine in a counterclockwise direction and exiting through conduit 33 and valve 35 into the chamber 24 to replenish the body of water 26b. Thus, by this structure the turbine is substantially continuously driven in the same direction upon pitching motion of the body in both directions. Neither water wheels 16' or turbines 16 in the water flow channels 15 on the upper surface of the body 10c are shown in these figures. However, the water wheels 16' or turbines 16 are preferably provided in the water flow channels for extraction of the energy in the moving surface water.

In FIG. 16 a modified two chamber version of the apparatus is indicated at A' and includes a buoyant body 36 generally cylindrical in cross sectional configuration and having a first interior wall 37 extending along a chord thereof subdividing the interior of the body into a bottom chamber 38 and an upper chamber which is in turn divided by a second interior wall 39 into a pair of chambers 40 and 41. An air passage 42 extends through the wall 39 establishing communication between the chambers 40 and 41 and volumes or bodies of water 43 and 44 are in the chambers 40 and 41 for flow therebetween. In this connection, a turbine 45 is supported in the wall 39 and first and second inlet conduits 46 and 47 extend from the respective bodies of water 43 and 44 to the upper portion of the turbine 45 for discharge of water onto the turbine to cause it to rotate. One-way valves 48 and 49 are in the conduits 46 and 47 for controlling flow therethrough. Additionally, one-way outlet valves 50 and 51 are provided at the bottom of the turbine opening into the respective chambers 40 and 41, whereby when the apparatus A' pitches in a first direction, water flows upwardly through the valve 49 and conduit 47 and discharges onto the turbine 45 and exits from the turbine through valve 50. Similarly, when the body or apparatus pitches in a second direction, water flows upwardly through valve 48 and conduit 46 and discharges onto the turbine 45 to cause the turbine to continue to rotate in the same direction and the water then discharges from valve 51. A moving weight 52 is disposed in the bottom chamber 38 for rolling movement along the inner surface of the bottom portion of the body 36 to enhance the inertia of movement of the body in its pitching motion. Further, an arm 53 extends from the leading side of body 36 and has a weight 54 supported thereon to further increase the inertia of movement of the body in its pitching movement. A further arm or projecting surface or body 55 extends from the trailing edge of the body 36 and carries a float 56 on the outer edge thereof. Vanes 57 and 58 are supported from the float 56 for cooperation with waves or flowing water and the vanes 57 and 58 are constructed and oriented such that they take maximum advantage of the force vectors of the moving water particles in the body of water. A superstructure 14' extends between the body 36 and vane 57 for channeling the linear flow of water over the apparatus to increase the velocity thereof, as in the previous forms of the invention.

A further form of the invention is illustrated in FIGS. 17 and 18, and in this form of the invention four different chambers 59, 60, 61 and 62 are provided with volumes or bodies of water 63, 64, 65 and 66 therein. Chambers 59 and 61 are in communication at their upper portions by means of a conduit 67 which enables air to flow from chamber 59 to 61 and vice versa, and chambers 60 and 62 are in communication at their upper end by means of a conduit 68 which enables air to flow between chambers 60 and 62. Further, an opening 69 is formed through wall 70 separating chambers 60 and 61, whereby the bodies of water 64 and 65 are permitted to flow back and forth between the chambers 60 and 61. A turbine 71, or other suitable water driven device, is supported in the body 10d between chambers 60 and 61 and a pair of inlet conduits 72 and 73 extend from the chambers 59 and 62 to adjacent the top portion of the turbine 71 for alternately conducting water from the respective chambers to the turbine to cause it to rotate. One-way valves 74 and 75 are associated with the inlet conduits 72 and 73 for controlling flow therethrough in one direction. Outlet conduits 76 and 77 extend from lower portions of the turbine 71 back to the chambers 59 and 62 for conveying the water thereto from the turbine 71. Thus, as seen in FIG. 18, when the apparatus pitches to the right, the body of water 63 in chamber 59 flows through valve 74 and conduit 72 and impinges upon the turbine 71 to cause the turbine to turn. The water exits the turbine through conduit 77 and valve 78 into the chamber 62. At the same time, water 64 in chamber 60 flows through opening 69 into chamber 61, compressing the air in chamber 61 and forcing it through conduit 67 into chamber 59 to pressurize the water in chamber 59 and enhance or increase its flow through the turbine 71. Similarly, the inflowing water from conduit 77 to chamber 62 pressurizes the air in chamber 62 which is communicated through conduit 68 with chamber 60 pressurizing the water in chamber 60 and enhancing its flow into chamber 61 to in turn enhance or increase pressurization of the air. Thus, a multiplication of pressures is obtained by the interconnection of the various chambers with the result that a pressurized flow of water through the turbine is caused. A similar effect is obtained when the apparatus pitches to the left.

A still further form of the invention is illustrated in FIGS. 19 and 20 and the operation of this form of the invention is substantially the same as that in FIGS. 17 and 18, in that four separate chambers 80, 81, 82 and 83 are interconnected for flow of air and water in a manner to increase the pressure flow of water, as described above. The various components of this form of the invention which correspond to the components of the form of the invention in FIGS. 17 and 18 are indicated by reference numerals primed. Thus, in this form of the invention, when the buoyant body 10d' is pitched to the right, as in FIG. 20, the body of water 64' in chamber 82 flows through opening 69' into chamber 83, compressing the air therein and forcing it through conduit 68' into chamber 80, pressurizing the body of water 63' in that chamber and enhancing its flow through valve 74', conduit 72' and thence through the turbine or the like 71' and through valve 79' into chamber 81.

In FIG. 21 a modification of the four chamber apparatus is indicated generally at A" and comprises a body 84 which is substantially cylindrical in shape as in the FIG. 16 embodiment and instead of having a lower chamber 38 with a weight 52 therein, the interior of the body 84 is subdivided into four chambers 80', 81', 82' and 83'. A turbine 45' is supported in the body and has a pair of inlet conduits 85 and 86 extending from the bodies of water in the respective chamber 80' and 81' to adjacent the upper portion of the turbine for discharging water onto the turbine. Outlet valves 87 and 88 extend from a lower portion of the turbine into the respective chambers 80' and 81' for through flow of water from the inlet conduits through the turbine and to the opposite chamber. The operation of water flowing between the chambers to pressurize air and thus pressurize and enhance flow of water between the chambers is the same as described in connection with FIGS. 17-20. Additionally, this form of the invention has members 53' and 55' projecting from the leading and trailing sides thereof, respectively, and a weight 54' is carried by the outer end of member 53', whereas pairs of vanes 57a and 57b and 58a and 58b are carried by the member 55' similarly to the corresponding members in FIG. 16. While a superstructure 14' is now shown in this figure, it should be understood that such could be provided along with its function, if desired.

In FIG. 22 a further modification of the invention is indicated generally at 89, and in this form of the invention the turbine or power takeoff structure 90 is external of the buoyant body 91. The buoyant body 91 is connected to the power takeoff structure 90 by an elongate connecting rod 92 secured at one end 93 on the axis of the center of buoyancy of the body 91 and secured at its other end 94 to the power takeoff structure 90. Suitable slotted brackets 95 and 96 are provided on the buoyant body 91 on opposite sides of the pivot axis or center of buoyancy of the body 91 and piston rods 97 and 98 are connected therewith and extend into the power takeoff structure 90 and are connected to pistons 99 and 100 reciprocable in cylinders 101, 102, respectively. The power takeoff structure 90 is supported in a relatively stable position in the body of water by means of vanes 103, 104 carried at the bottoms of suitable supports 105 and 106, respectively.

A turbine or water wheel or the like 107 is mounted within a housing 108 inside the power takeoff structure 90 and a pair of inlet passages 109 and 110 extend to the turbine or the like from opposite ends of cylinder 102 through valves 111 and 112, whereby as the piston 100 reciprocates in respective opposite directions, a liquid, such as water or the like, contained within cylinder 102 is forced through the respective inlet passage depending upon the direction of movement of piston 100 and past the turbine or other suitable water driven device to produce useful work. The water or other suitable liquid or fluid supplied to the turbine or the like via inlet passages 109 and 110 is exhausted from the turbine or the like via outlet passages 113 and 114 through one-way valves 115 and 116, respectively. Similarly, a pair of inlet passages 109a and 110a are provided in communication with opposite ends of the other piston cylinder 101 and corresponding outlet passages 113a and 114a are also provided, with the passages being controlled by suitable one-way valve means. Thus, pitching movement of the buoyant body 91 in both directions causes reciprocation of the pistons 99 and 100 to substantially continuously force fluid through the turbine or other water driven means 107 to produce useful work.

In FIG. 23 a further modification of the invention is indicated generally at 117 and is similar to the invention shown in FIG. 22, except that the superstructure 14 is provided on top of the buoyant body 91' and the connecting rod 92' extends from the axis of rotation or center of buoyancy of the body 91' to a piston 118 reciprocable in a cylinder 119 rather than being rigidly secured to the structure 90', as in FIG. 22. Suitable inlet and outlet passages extend from the respective cylinders 101', 119 and 102' to the turbine or other suitable water driven means 107' to drive the turbine or the like upon pitching movement of the body 91' in both directions, as well as upon heaving movement thereof due to the connection with rod 92' and piston 118. A water vane or the like 120 is connected with the structure 90' by means of a connecting member 121 to tend to immobilize the structure 90' in the body of water while the buoyant body 91' is moving, whereby the movement of the body 91' can be converted into movement of the pistons 99', 118 and 100' to produce useful work.

In FIG. 24 a still further form of the invention is indicated generally at 122 and comprises a buoyant body 123 with a superstructure 14 thereon as previously described. A suitable slotted bracket 124 is carried by the body 123 at the leading edge thereof and suitable weight means or the like 125 is also carried by the body at the leading edge for enhancing the pitching movement thereof, as described in connection with previous forms of the invention. A connecting rod 126 extends from the slotted bracket 124 to a piston 127 reciprocable in a cylinder 128 formed in a power takeoff structure 129 which has suitable water vanes 130 and 131 carried thereby to tend to immobilize the structure 129 in the body of water. Resilient bumpers 132 and 133 are disposed in the cylinder 128 at opposite ends thereof for cushioning travel of the piston 127 at its opposite limits of travel. A turbine or other suitable water drive device 134 is supported adjacent the cylinder 128 and a pair of inlet conduits 135 extend from opposite ends of the cylinder 128 to the turbine or the like 134 for conveying pressure fluid thereto to drive the turbine or the like in both the up and down pitching movement of the body 123. Suitable valves 136 and 137 control flow through the inlet conduits 135 for appropriate movement of water through the conduits upon movement of the piston in its respective opposite directions. Similarly, a pair of outlet conduits 138 and 139 extend from the turbine or the like 134 back to the opposite ends of the cylinder 128 and flow therethrough is controlled by a pair of valves 140 and 141, respectively.

In FIG. 25 yet another form of the invention is indicated at 142, and in this form of the invention the buoyant body 123' has a superstructure 14 thereon as in FIG. 24, but rather than the piston rod 126 connected for movement upon pitching motion of the body, a rod 143 is secured to the center of buoyancy or axis of the center of buoyancy of the body 123' and extends downwardly and is rigidly connected with the structure 129' which defines a cylinder 128' therewithin having a piston 144 reciprocable in the cylinder 128', the piston being carried by a rod 145 extending downwardly from the cylinder 128' and connected to a water vane 146, whereby up and down heaving motion of the body 123' causes the cylinder 128' to move up and down therewith relative to the piston 144 which is maintained in a relatively immobile position by the vane 146. A turbine or other suitable water driven means 134' is connected to be operated just as in the FIG. 24 embodiment.

Figure 26:
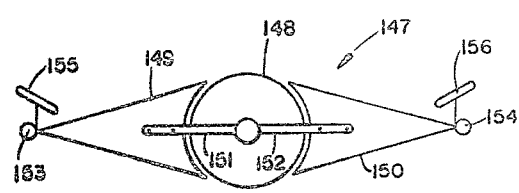
FIGS. 26 and 27 are elevation and plan views, respectively, of yet another modification of the invention wherein a butterfly-like construction is used with floats at opposite sides of a central body.
Figure 29:
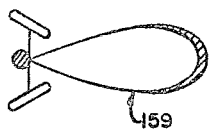
FIGS. 29-35 are somewhat diagrammatic views in elevation with portions shown in section of further forms or modifications or variations of the invention.
Figure 30:
Figure 27:
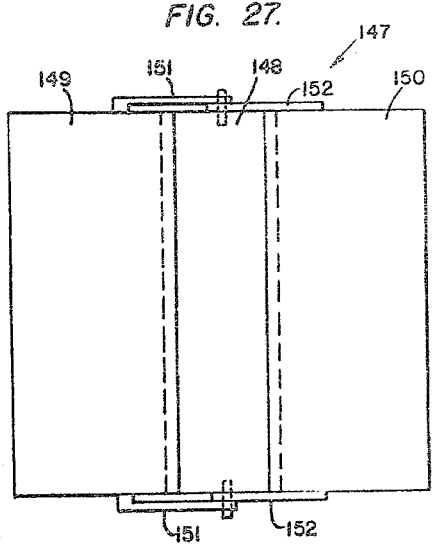
Figure 31:
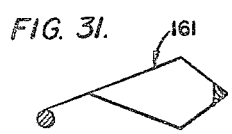
Figure 32:
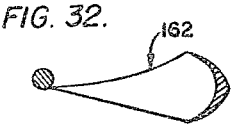
Figure 33:
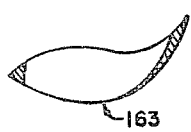
Figure 34:

Yet another form of the invention is indicated generally at 147 in FIGS. 26 and 27 and comprises a central buoyant body 148 of substantially cylindrical configuration and a pair of substantially identically constructed buoyant body members or wings 149 and 150 pivotally joined to the axis of central member 148 by connecting rods or bars 151 and 152, respectively. The outer ends or edges of the members 149 and 150 have weights 153 and 154 thereon for enhancing the pitching movement thereof and water vanes 155 and 156 are also connected to the wings at their outer ends or edges to take maximum advantage of the motion or movement of the water particles in the waves. The apparatus shown in FIG. 26 may be used to operate an internal turbine or other water driven device, as in FIGS. 13–21, for example, or it may be used to operate external turbines or water driven devices, such as in FIGS. 22–25. Moreover, the apparatus may be used to operate a combination of elements as previously described.

Figure 28:
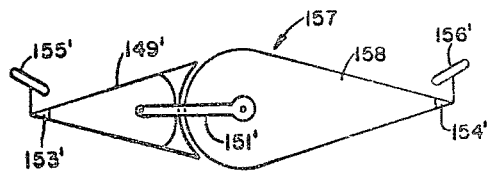
FIG. 28 is a view in elevation of a modification of the invention shown in FIG. 26 wherein only one movable float member extends from one side of the apparatus.
Figure 35:
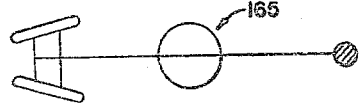

Yet another form of the invention is indicated generally at 157 in FIG. 28 and this form of the invention is similar to that shown in FIGS. 26 and 27, except that only one wing body member 149' is provided and the cylindrical central body portion 148' is integral with the tapered body portion 158 extending to the right as viewed in FIG. 28 and forming the second wing-like body member. Weights 153' and 154' are provided at the outer ends of the tapered body members and water vanes 155' and 156' are also carried thereby, as in the form of the invention in FIGS. 26 and 27. This form of the invention may also be used to drive either internal or external turbine means or the like or a combination thereof as in the previously described forms of the invention.

In FIGS. 29–35 several different variations of buoyant body members are illustrated at 159–165, respectively, and each of the buoyant body members has weight means associated therewith and/or water vanes as in the previously described forms of the invention. Details of construction of these forms of the invention have been omitted, since it is believed that in view of the foregoing disclosure the specific construction and arrangement of parts in these forms of the invention will be readily apparent to those skilled in the art.

Thus, while specific forms and constructions of the invention have been illustrated and described, it should be noted that various other configurations of the buoyant body member may be provided and various materials may be used in its construction.

Essentially, the present invention provides a unique means for extracting energy from the ocean's waves, wherein the apparatus according to the invention has means for extracting energy from the pitching motion of the apparatus caused by the waves in both directions of pitching thereof, and in addition, means is provided for extracting energy due to the heaving motion of the apparatus. Further, the apparatus is uniquely configured to densify the energy in the waves by converting the rolling or orbital motion of water particles in the waves to linear motion and then accelerating the linear motion of water particles and utilizing the accelerated linear flow to drive a turbine or like water driven means.

Moreover, the present invention is uniquely suitable for extracting or collecting uranium from sea water merely by placing a known material on the upper surface of the buoyant body which, through ionic exchange removes uranium from the sea water as it flows over the surface.

Still further, the apparatus of the present invention is useful not only to extract power from the waves in the Earth's oceans, but is also effective to create still water areas for use as harbors or protected areas and the like, since the effect of the apparatus according to the invention is to dampen or extinguish waves. The same principle may be used to contain oil spills and the like, since the high velocity flow of water created over the surface of the apparatus forms a unidirectional flow of water which by strategically placing a plurality of apparatus according to the invention can be used to direct an oil spill or the like toward a central gathering area or the like. Similarly, the apparatus according to the invention can be used to stir and dissipate pollutants in heavily polluted areas of water adjacent coast lines and the like where the water movement is not adequate to dissipate pollutants spilled thereinto.

Additionally, the apparatus of the present invention may be utilized with existing technology to produce hydrogen from the energy of the waves when the energy is not directly converted to electrical energy and used immediately, or transferred to shore for later recovery of the hydrogen and use as desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. Apparatus for obtaining useful work from or with waves, comprising: a buoyant body having an upper surface and a leading edge and a trailing edge, and constructed to float at the surface of a body of water with the upper surface of the buoyant body disposed beneath the surface of the body of water, said trailing edge being convex and curving sharply downward, said buoyant body having width and length dimensions selected such that the smaller of said dimensions is not substantially greater than approximately one half of the wave length, the movement of water particles in the waves being active upon the buoyant body in both directions of pitching motion to efficiently impart energy force to the buoyant body in both directions of pitching motion as well as in heaving motion; and mechanical means associated with the buoyant body and connected therewith to be driven by at least one of the heaving and pitching motions of the buoyant body, said mechanical means including a housing spaced from and supported by the buoyant body, said housing being divided into two chambers, water confined within said chambers, and said chambers being interconnected with one another through a water driven means for flow of water back and forth between the chambers through the water driven means upon pitching motion of the body to thus obtain useful work from the energy in the waves.

* * * * *